US009950730B2

(12) United States Patent
Gao

(10) Patent No.: US 9,950,730 B2
(45) Date of Patent: Apr. 24, 2018

(54) BABY STROLLER

(71) Applicant: Goodbaby Child Products Co., Ltd., Kunshan, Jiangsu (CN)

(72) Inventor: Xiang Gao, Jiangsu (CN)

(73) Assignee: GOODBABY CHILD PRODUCTS CO., LTD., Kunshan, Jiangsu (CN)

( * ) Notice: Subject to any disclaimer, the term of this patent is extended or adjusted under 35 U.S.C. 154(b) by 0 days.

(21) Appl. No.: 15/305,438

(22) PCT Filed: Aug. 5, 2016

(86) PCT No.: PCT/CN2016/093429
§ 371 (c)(1),
(2) Date: Oct. 20, 2016

(87) PCT Pub. No.: WO2017/080265
PCT Pub. Date: May 18, 2017

(65) Prior Publication Data
US 2017/0267272 A1    Sep. 21, 2017

(30) Foreign Application Priority Data
Nov. 10, 2015    (CN) ............... 2015 2 0890630 U

(51) Int. Cl.
*B62B 7/06* (2006.01)
*B62B 7/08* (2006.01)

(52) U.S. Cl.
CPC .......... *B62B 7/062* (2013.01); *B62B 7/064* (2013.01); *B62B 7/08* (2013.01); *B62B 2205/20* (2013.01)

(58) Field of Classification Search
CPC .......... B62B 7/062; B62B 7/064; B62B 7/08; B62B 2205/20
See application file for complete search history.

(56) References Cited

U.S. PATENT DOCUMENTS

| | | | | |
|---|---|---|---|---|
| 4,606,550 A | * | 8/1986 | Cone ...................... | B62B 7/08 280/642 |
| 4,632,420 A | * | 12/1986 | Miyagi .................. | B62B 7/08 280/47.39 |
| 4,848,787 A | * | 7/1989 | Kassai ................... | B62B 7/08 280/42 |
| 5,553,885 A | * | 9/1996 | Chang .................... | B62B 7/08 280/642 |
| 7,374,196 B2 | * | 5/2008 | Hartenstine ........... | B62B 7/08 280/47.38 |
| 7,641,216 B2 | * | 1/2010 | Cone, II ................ | B62B 7/068 280/42 |

(Continued)

FOREIGN PATENT DOCUMENTS

CN    204222933 U  *  3/2015    ............... B62B 7/06

*Primary Examiner* — Jacob B Meyer
(74) *Attorney, Agent, or Firm* — Hauptman Ham, LLP

(57) ABSTRACT

A baby stroller includes a frame having front and rear wheel supports, a seat rod, a push rod and a support rod. The front and rear wheel supports form a first rotating joint. The push rod includes upper and lower push rods, the lower push rod is connected to the first rotating joint. The lower push rod and the upper push rod form a second rotating joint. The support rod is rotatably connected with the upper push rod. The support rod is rotatably connected with the rear wheel support. The seat rod is rotatably connected with the front wheel support. The seat rod is rotatably connected with the support rod. Rotating the upper push rod around the second rotating joint drives the lower push rod, the support rod, the front wheel support, the rear wheel support and the seat rod to fold the stroller.

8 Claims, 4 Drawing Sheets

(56) References Cited

U.S. PATENT DOCUMENTS

| | | | | |
|---|---|---|---|---|
| 7,780,183 B2* | 8/2010 | Chen | ............................ | B62B 7/08 |
| | | | | 280/47.38 |
| 7,900,952 B2* | 3/2011 | Cone, II | ................... | B62B 7/068 |
| | | | | 280/642 |
| 8,496,263 B2* | 7/2013 | Wu | ............................ | B62B 7/068 |
| | | | | 280/47.38 |
| 8,590,919 B2* | 11/2013 | Yi | ............................ | B62B 7/062 |
| | | | | 280/642 |
| 8,602,442 B2* | 12/2013 | Li | ............................ | B62B 7/062 |
| | | | | 280/642 |
| 8,936,267 B2* | 1/2015 | Li | ............................ | B62B 7/00 |
| | | | | 280/30 |
| 8,961,057 B2* | 2/2015 | Schroeder | ................ | F16C 11/10 |
| | | | | 280/647 |
| 9,050,993 B2* | 6/2015 | Pollack | ....................... | B62B 9/12 |
| 9,108,660 B2* | 8/2015 | Sundberg | ................... | B62B 7/10 |
| 9,168,939 B2* | 10/2015 | Gu | ............................ | B62B 9/203 |
| 9,517,788 B2* | 12/2016 | He | ............................ | B62B 7/086 |
| 9,545,940 B2* | 1/2017 | Taylor | ...................... | B62B 7/142 |
| 2005/0098983 A1* | 5/2005 | Cheng | ........................ | B62B 7/08 |
| | | | | 280/642 |
| 2012/0104729 A1* | 5/2012 | Yi | ............................ | B62B 7/08 |
| | | | | 280/642 |
| 2012/0112435 A1* | 5/2012 | Kobayashi | .............. | B62B 7/062 |
| | | | | 280/647 |
| 2014/0008895 A1* | 1/2014 | Lee | ............................ | B62B 7/062 |
| | | | | 280/647 |
| 2016/0167690 A1* | 6/2016 | Lin | ............................ | B62B 7/062 |
| | | | | 280/642 |
| 2016/0185376 A1* | 6/2016 | He | ............................ | B62B 7/086 |
| | | | | 280/650 |
| 2017/0144687 A1* | 5/2017 | Li | ............................ | B62B 7/062 |

* cited by examiner

BABY STROLLER

RELATED APPLICATIONS

The present application is a National Phase of International Application No. PCT/CN2016/093429, filed Aug. 5, 2016, and claims the priority of China Application No. CN201520890630.0, filed Nov. 10, 2015, which are incorporated herein by reference in their entireties.

FIELD OF INVENTION

The present application relates to a baby stroller.

BACKGROUND OF THE INVENTION

At present, for the convenience of storage and transportation, the baby stroller is usually designed in a foldable manner. However, the existing strollers are folded by pushing the push rod followed by folding other parts of the frame. The folding procedure is complicated, and basically cannot be achieved in one folding step.

SUMMARY OF THE INVENTION

The technical problems solved by present application is to provide a baby stroller of simple structure and convenient for folding.

To solve the above technical problems, the present application employs the following technical scheme: a baby stroller, comprises a frame with a unfolded state and a folded state, front wheels provided in the front portion of the frame at the bottom, rear wheels provided in the rear portion of the frame at the bottom, and a locking mechanism for locking the frame in the unfolded state. The frame comprises a front wheel support a lower portion of which connected with the front wheels, a rear wheel support a lower portion of which connected with the rear wheels, a seat rod, a push rod and a support rod; the front wheel support and the rear wheel support intersect to form a first rotating joint, and are both capable of rotating around the first rotating joint; the push rod comprises an upper push rod and a lower push rod, a lower portion of the lower push rod being rotatably connected to the first rotating joint, an upper portion of the lower push rod and the upper push rod intersecting to form a second rotating joint; an upper portion of the support rod is rotatably connected with the upper push rod, a lower portion of the support rod is rotatably connected with the rear wheel support, a front portion of the seat rod is rotatably connected with the front wheel support, and a rear portion of the seat rod is rotatably connected with the support rod; the locking mechanism is provided at the second rotating joint and capable of locking the upper push rod and the lower push rod to each other; when the frame is in the unfolded state, the front wheel support and the rear wheel support support each other, the upper push rod and the lower push rod extend towards the direction facing away from the front wheels, the locking mechanism locks the upper push rod and the lower push rod to each other, the support stands aslant between the lower push rod and the rear wheel support, and the seat rod is unfolded between the front wheel support and the support rod; when the frame is in the folded state, the locking mechanism is unlocked, the front wheel support, the rear wheel support, the upper push rod, the lower push rod, the support rod and the seat rod all get close to each other and folded together.

Preferably, a torsional spring is provided where the upper push rod and the lower push rod intersect to form the second rotating joint, and when the locking mechanism is unlocked, the upper push rod is driven by the torsional spring to roll forwards around the second rotating joint.

Preferably, the stroller further comprises an unlocking mechanism comprising a pulling cable and an unlocking belt, the pulling cable being provided inside the frame, an upper end of the pulling cable extending beyond the frame and being connected with the locking mechanism, a lower end of the pulling cable extending beyond the frame and being connected with the unlocking belt, the unlocking belt being located between the rear wheel supports on each side, and pulling the unlocking belt is able to unlock the locking mechanism via the pulling cable.

In particular, an upper end portion of the front wheel support and an upper end portion of the rear wheel support intersect to form the first rotating joint, and the rotatable connection joint between the seat rod and the front wheel support is below the first rotating joint.

In particular, the upper push rod is formed by fixedly intersecting an upper rod and a lower rod, the second rotating joint formed by the lower push rod and the upper push rod is located where the upper rod and the lower rod intersect, and the support rod and a lower portion of the lower rod are rotatably connected.

Further, when the frame is in the unfolded state, the rotatable connection joint between the support rod and the lower rod is below the second rotating joint, and the rotatable connection joint between the support rod and the rear wheel support is below the connection joint between the support rod and the seat rod.

In particular, the rear wheel support, the lower push rod, the lower rod and the support rod form a four-link mechanism.

In particular, when the frame is in the unfolded state, the lower push rod and the upper rod are substantially in the same line, and the lower rod and the support rod are substantially in the same line.

The above mentioned orientation terms such as front, rear, upper, lower and the like, are defined as the orientations when the stroller is in normal use.

The scope of the present application is not limited to technical schemes specifically combined by the above technical features, and should encompass other technical schemes formed by any combination of the above technical features or the equivalent features thereof. For example, the technical scheme is formed by substituting between the above technical features and the technical features with similar functions disclosed by the present invention (but not limited to).

Due to the use of the above technical schemes, the present application has the following advantages over the prior art: the upper push rod and the lower push rod rotatably connected form the push rod, and rotating the upper push rod around the second rotating joint after unlocking, drives the lower push rod, the support rod, the front wheel support, the rear wheel support and the seat rod to get close to each other and fold, folding the entire stroller in one step is achieved, with less folding steps, and is simple and convenient; a torsional spring is provided at the second rotating joint to drive the upper push rod to roll forwards and get close to the lower push rod and be folded after the upper push rod and the lower push rod are unlocked, and there is no need to fold manually; by providing the unlocking mechanism, pulling the unlocking belt is able to achieve the folding of the stroller by lifting, and folding the stroller is more simple and convenient.

Wherein, 1—upper push rod; 2—lower push rod; 3—front wheel support; 4—rear wheel support; 5—support rod; 6—seat rod; 7—first rotating joint; 8—second rotating joint; 9—front wheel; 10—rear wheel; 11—upper rod; 12—lower rod; 13—pulling cable; 14—unlocking belt.

DETAILED DESCRIPTION OF EXEMPLARY EMBODIMENTS

Figure 1:
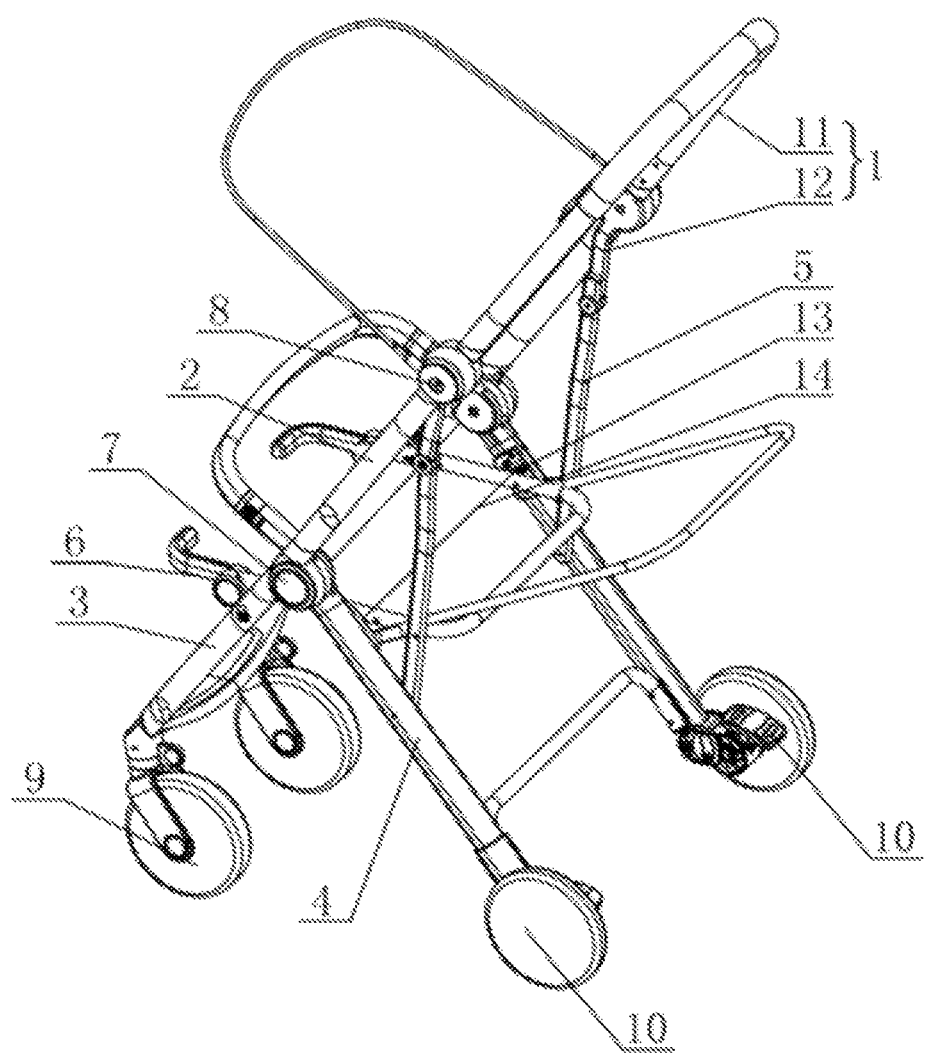
FIG. 1 is a three-dimensional schematic view of a baby stroller of the present application in the unfolded state.
Figure 2:
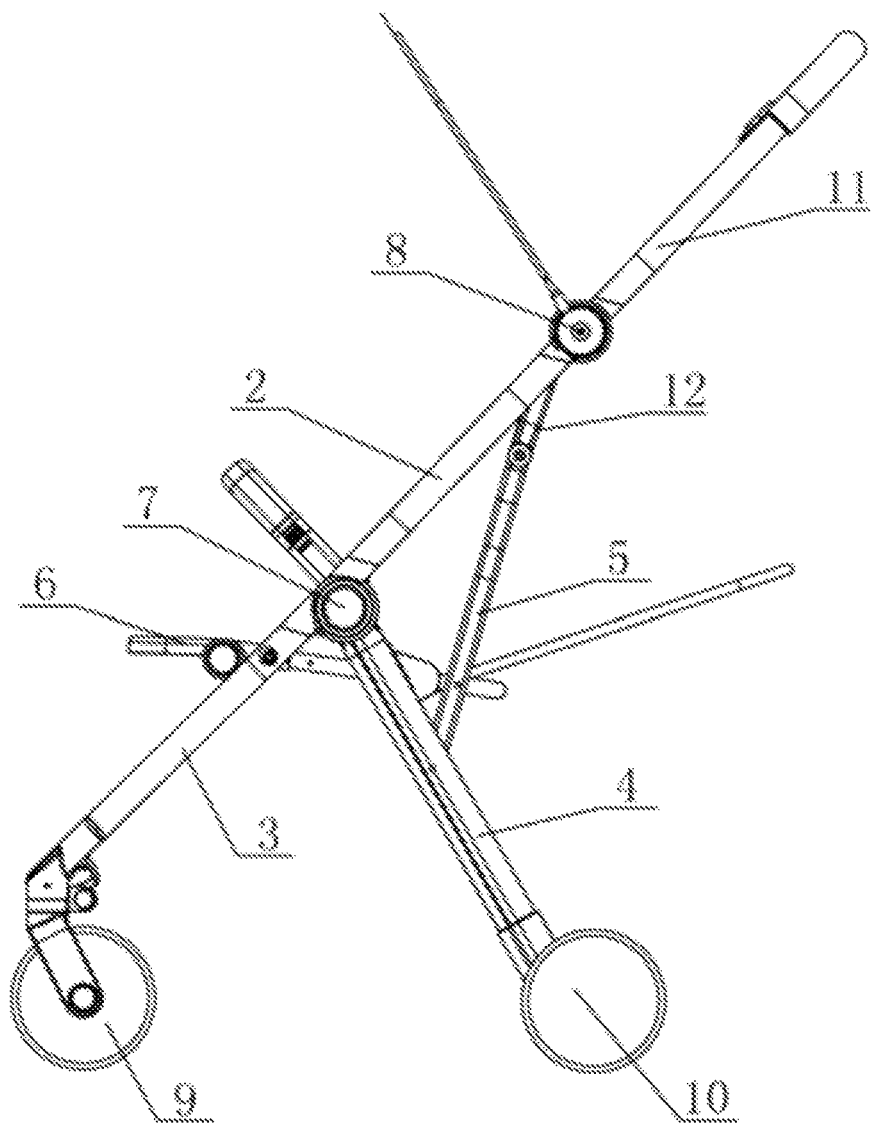
FIG. 2 is a side view of the baby stroller of the present application in the unfolded state.
Figure 3:
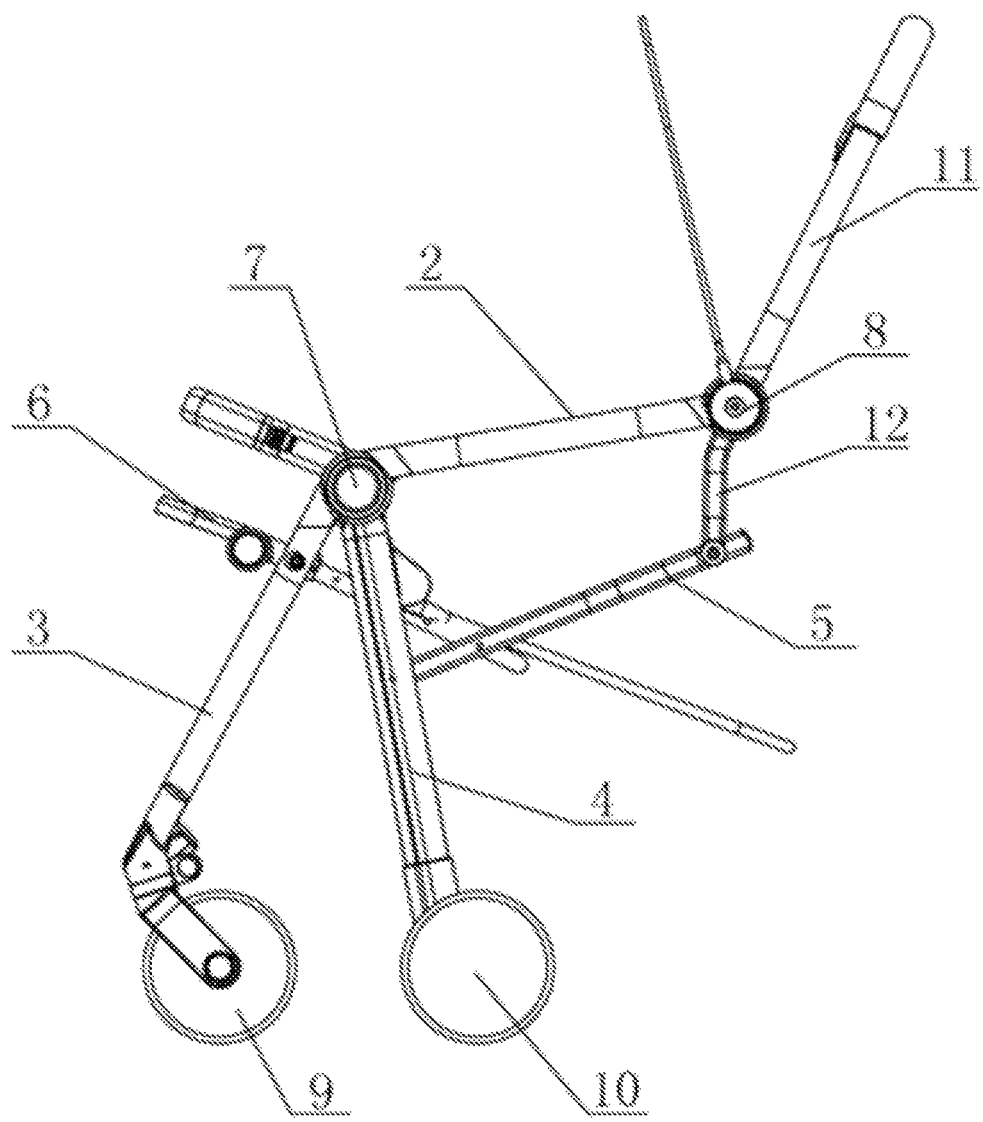
FIG. 3 is a side view of the baby stroller of the present application in the half-folded state.
Figure 4:
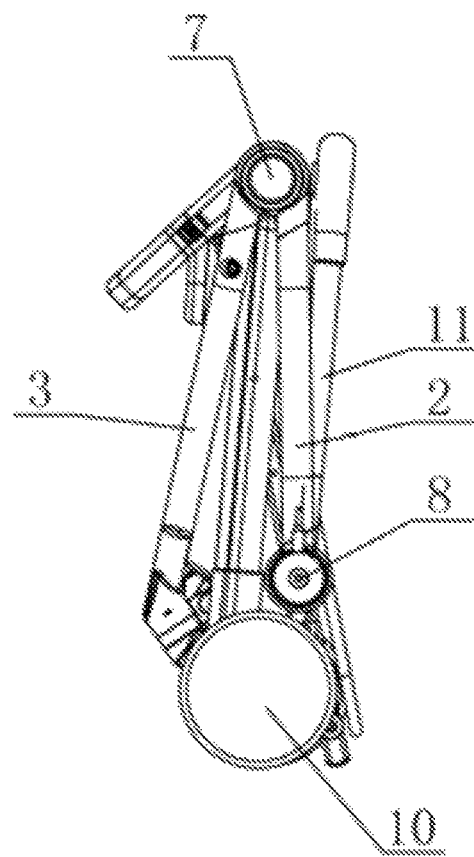
FIG. 4 is a side view of the baby stroller of the present application in the folded state.

As shown in FIG. 1 to FIG. 4, a baby stroller of the present application, comprises a frame with a unfolded state and a folded state, front wheels 9 provided in the front portion of the frame at the bottom, rear wheels 10 provided in the rear portion of the frame at the bottom, and a locking mechanism for locking the frame in the unfolded state.

The frame comprises a front wheel support 3 a lower portion of which connected with the front wheels 9, a rear wheel support 4 a lower portion of which connected with the rear wheels 10, a seat rod 6, a push rod and a support rod 5. An upper end portion of the front wheel support 3 and an upper end portion of the rear wheel support 4 intersect to form a first rotating joint 7, and the front wheel support 3 and the rear wheel support 4 are capable of rotating around the first rotating joint 7, respectively. The push rod comprises an upper push rod 1 and a lower push rod 2, a lower portion of the lower push rod 2 being rotatably connected to the first rotating joint 7, an upper portion of the lower push rod 2 and the upper push rod 1 intersecting to form a second rotating joint 8, and an upper portion of the support rod 5 is rotatably connected with the upper push rod 1. In the present embodiment, the upper push rod 1 is formed by fixedly intersecting an upper rod 11 and a lower rod 12, the second rotating joint 8 formed by the lower push rod 2 and the upper push rod 1 is located where the upper rod 11 and the lower rod 12 intersect, and the connection formed by the support rod 5 and the lower rod 1 is located at a lower portion of the lower rod 12. A lower portion of the support rod 5 is rotatably connected with the rear wheel support 4, a front portion of the seat rod 6 is rotatably connected with the front wheel support 3, and a rear portion of the seat rod 6 is rotatably connected with the support rod 5. The rotatable connection joint formed by the seat rod 6 and the front wheel support 3 is below the first rotating joint 7. The rear wheel support 4, the lower push rod 2, the lower rod 12 and the support rod 5 form a four-link mechanism.

The locking mechanism is provided at the second rotating joint 8 and capable of locking the upper push rod 1 and the lower push rod 2 to each other. A torsional spring is provided where the upper push rod 1 and the lower push rod 2 intersect to form the second rotating joint 8, and when the locking mechanism is unlocked, the upper push rod 1 is driven by the torsional spring to roll forwards around the second rotating joint 8. This results that there is no need to rotate the upper push rod 1 manually when folding, and the upper push rod 1 can roll forward automatically under the action of the torsional spring and self weight.

The baby stroller further comprises an unlocking mechanism comprising a pulling cable 13 and an unlocking belt 14, the pulling cable 13 being provided inside the frame, an upper end of the pulling cable 13 extending beyond the frame and being connected with the locking mechanism, a lower end of the pulling cable 13 extending beyond the frame and being connected with the unlocking belt 14, the unlocking belt 14 being located between the rear wheel support 4 on each side, and pulling the unlocking belt 14 is able to unlock the locking mechanism via the pulling cable 13.

When the frame is in the unfolded state, the front wheel support 3 and the rear wheel support 4 support each other, the upper push rod 1 and the lower push rod 2 extend towards the direction facing away from the front wheels 9, the locking mechanism locks the upper push rod 1 and the lower push rod 2 to each other, the support 5 stands aslant between the lower push rod 2 and the rear wheel support 4, and the seat rod 6 is unfolded between the front wheel support 3 and the support rod 5. The rotatable connection joint formed by the support rod 5 and the lower rod 12 is below the second rotating joint 8, and the rotatable connection joint formed by the support rod 5 and the rear wheel support 4 is below the connection joint formed by the support rod 5 and the seat rod 6. The lower push rod 2 and the upper rod 11 are substantially in the same line, and the lower rod 12 and the support rod 5 are substantially in the same line.

When the frame is in the folded state, the locking mechanism is unlocked, the front wheel support 3, the rear wheel support 4, the upper push rod 1, the lower push rod 2, the support rod 5 and the seat rod 6 all get close to each other and folded together.

To fold the baby stroller in the unfolded state, the locking mechanism is unlocked by directly pulling the unlocking belt 14 and pulling the pulling cable 13 via the unlocking belt 14. The upper push rod 1 is driven by the torsional spring to roll forwards around the second rotating joint 8. Meanwhile, the front wheel support 3 rotates around the first rotating joint 7 under the action of self-weight and gets close towards the rear wheel support 4, the front wheel support 3 rotates and pushes the seat rod 6 to move backward, and the seat rod 6 pushes the support rod 5 to move backward. The rear wheel support 4, the lower push rod 2, the lower rod 12 and the support rod 5 form a four-link mechanism, the support rod 5 drives the whole upper push rod 1 to move, and then drives the lower push rod 2 to move downward, and then drives the front wheel support 3, the rear wheel support 4, the upper push rod 1, the lower push rod 2, the support rod 5 and the seat rod 6 all to get close to each other and folded together, and the folding of the baby stroller is achieved. It can be seen that, the present application realizes the "lift to fold" function of the baby stroller, simple and convenient for folding, of less steps and not complicated.

To unfold the baby stroller in a unfolded state, it only needs to pull and rotate the upper push rod 11 around the second rotating joint 8 to unfold, and the front wheel support 3, the rear wheel support 4, the lower push rod 2, the support rod 5 and the seat rod 6 all stretch out one by one, and the unfolding of the stroller is achieved by locking the frame via the locking mechanism.

As above described, the present invention is explained according to the purpose thereof, but the present application is not limited to the above-mentioned embodiments and implement methods. Various variations and implementations can be made by the practitioners of the relative technical fields within the technical concept of the present invention.

What is claimed is:

1. A baby stroller, comprising a frame with an unfolded state and a folded state, front wheels provided in the front portion of the frame at the bottom, rear wheels provided in the rear portion of the frame at the bottom, and a locking mechanism for locking the frame in the unfolded state, wherein the frame comprises a front wheel support a lower portion of which connected with the front wheels, a rear wheel support a lower portion of which connected with the rear wheels, a seat rod, a push rod and a support rod; the front wheel support and the rear wheel support intersect to form a first rotating joint, and are both capable of rotating around the first rotating joint; the push rod comprises an upper push rod and a lower push rod, a lower portion of the lower push rod being rotatably connected to the first rotating joint, an upper portion of the lower push rod and the upper push rod intersecting to form a second rotating joint; an upper portion of the support rod is rotatably connected with the upper push rod, a lower portion of the support rod is rotatably connected with the rear wheel support, a front portion of the seat rod is directly rotatably connected with the front wheel support, and a rear portion of the seat rod is rotatably connected with the support rod; the locking mechanism is provided on the second rotating joint and capable of locking the upper push rod and the lower push rod to each other; when the frame is in the unfolded state, the front wheel support and the rear wheel support support each other, the upper push rod and the lower push rod extend towards the direction facing away from the front wheels, the locking mechanism locks the upper push and the lower push rod to each other, the support rod stands aslant between the lower push rod and the rear wheel support, and the seat rod is unfolded between the front wheel support and the support rod; when the frame is in the folded state, the locking mechanism is unlocked, the front wheel support, the rear wheel support, the upper push rod, the lower push rod, the support rod and the seat rod all get close to each other and folded together.

2. The baby stroller according to claim 1, wherein, a torsional spring is provided where the upper push rod and the lower push rod intersect to form the second rotating joint, and when the locking mechanism is unlocked, the upper push rod is driven by the torsional spring to roll forwards around the second rotating joint.

3. The baby stroller according to claim 1, wherein, the stroller further comprises an unlocking mechanism comprising a pulling cable and an unlocking belt, the pulling cable being provided inside the frame, an upper end of the pulling cable extending outside the frame and being connected with the locking mechanism, a lower end of the pulling cable extending outside the frame and being connected with the unlocking belt, the unlocking belt being located between the rear wheel supports on each side, and pulling the unlocking belt is able to unlock the locking mechanism via the pulling cable.

4. The baby stroller according to claim 1, wherein, an upper end portion of the front wheel support and an upper end portion of the rear wheel support intersect to form the first rotating joint, and the rotatable connection joint formed by the seat rod and the front wheel support is below the first rotating joint.

5. The baby stroller according to claim 1, wherein, the upper push rod is formed by fixedly intersecting an upper rod and a lower rod, the second rotating joint formed by the lower push rod and the upper push rod is located where the upper rod and the lower rod intersect, and the support rod and a lower portion of the lower rod are rotatably connected.

6. The baby stroller according to claim 5, wherein, when the frame is in the unfolded state, the rotatable connection joint formed by the support rod and the lower rod is below the second rotating joint, and the rotatable connection joint formed by the support rod and the rear wheel support is below the connection joint formed by the support rod and the seat rod.

7. The baby stroller according to claim 6, wherein, the rear wheel support, the lower push rod, the lower rod and the support rod form a four-link mechanism.

8. The baby stroller according to claim 7, wherein, when the frame is in the unfolded state, the lower push rod and the upper rod are substantially in the same line, and the lower rod and the support rod are substantially in the same line.

* * * * *